(No Model.)
W. J. PLECKER.
KETTLE.
No. 493,782. Patented Mar. 21, 1893.
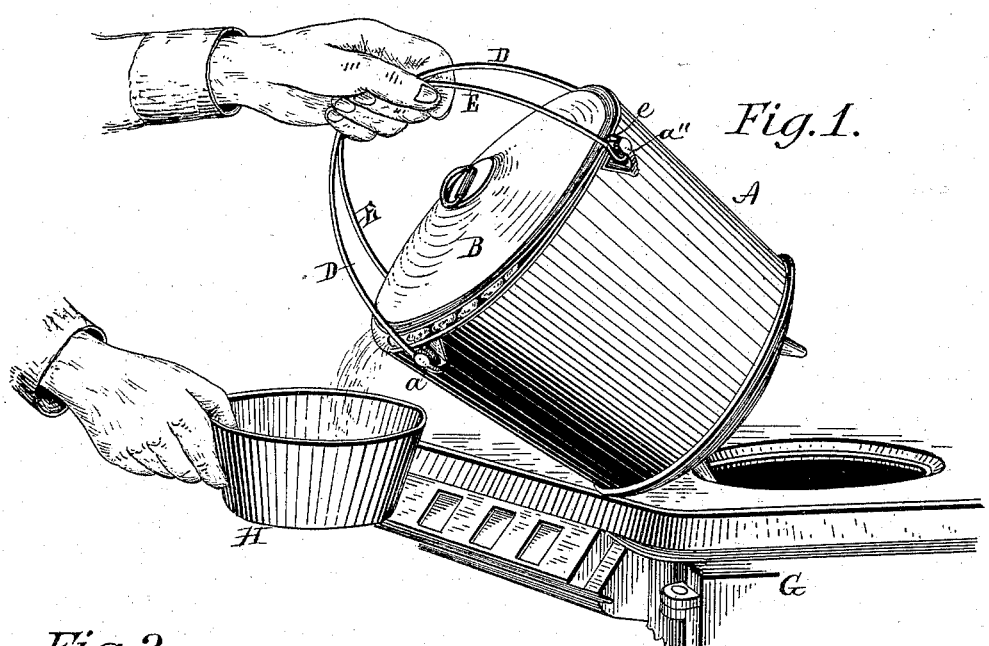
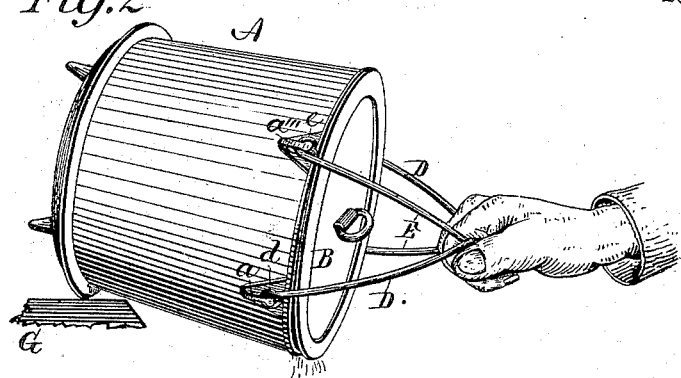
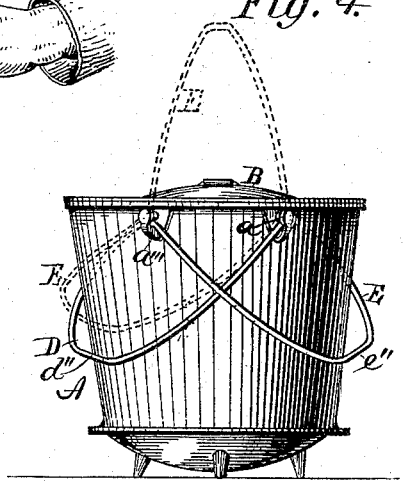
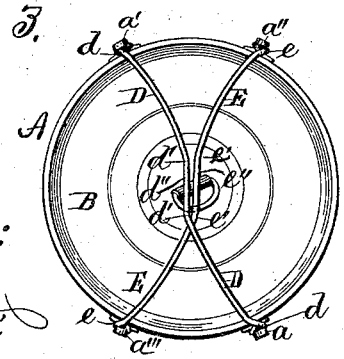
Witnesses:
Wm N Rowe
H. W. Richards
Inventor:
Wm. J. Plecker
By W. R. Richards
Atty.
THE NORRIS PETERS CO., PHOTO-LITHO., WASHINGTON, D. C.

UNITED STATES PATENT OFFICE.

WILLIAM J. PLECKER, OF GALESBURG, ILLINOIS.

KETTLE.

SPECIFICATION forming part of Letters Patent No. 493,782, dated March 21, 1893.

Application filed January 26, 1886. Serial No. 189,821. (No model.)

*To all whom it may concern:*

Be it known that I, WILLIAM J. PLECKER, a citizen of the United States, residing at Galesburg, in the county of Knox and State of Illinois, have invented certain new and useful Improvements in Kettles, of which the following is a specification.

This invention relates to an improvement in kettles and consists in the construction and arrangement of parts hereinafter described and definitely pointed out in the claim.

In the accompanying drawings, which illustrate a practical method of applying and using my invention:—Figure 1 is a perspective, showing the invention and one of its uses. Fig. 2 is also a perspective. Fig. 3 is a top plan, showing the bails in same positions as at Figs. 1 and 2. Fig. 4 is a side elevation, showing both bails turned down to their hanging positions by full lines, and in other positions in dotted lines, as hereinafter described.

In the different figures of the drawings, the letter A designates a kettle, which may be of any ordinary or desired construction, and which is provided with a lid B, the edge of which extends to the outer surface of the upper part or rim of the kettle on which the lid rests.

D is a bail, the hook shaped ends $d$ of which are engaged with kettle ears $a$, $a'$, which ears are diametrically opposite each other on the kettle, and are located on the outer surface of the kettle and below its upper edge or rim. The ears $a$, $a'$, and the hooks on the bail D may be constructed as shown, or in any desired operative manner. The bail D is curved substantially in the ordinary manner; except that for the purpose of holding the lid, as hereinafter described, it is made to fit snug or close to the edge of the lid when the bail is elevated,—the lid, as hereinbefore described, extending out flush with the outer edge of the rim of the kettle for that purpose.

E is a bail similar to the bail D, and has hook shaped ends $e$ which engage with kettle ears $a''$ $a'''$ that are diametrically opposite each other on the kettle, and located on the outer surface and below the rim of the kettle, as are the ears $a$, $a'$. The bail E is a little shorter than the bail D, so that it will swing inside of the bail D. The several ears are preferably located circumferentially on the kettle substantially as shown plainest at Fig. 3, that is, with the ears $a$ $a'''$ less than half the distance apart of the ears $a$, $a''$, or of the ears $a'$ and $a'''$; and with the ears $a'$, $a''$, same or nearly same distance apart as the ears $a$, $a'''$. The bail D has lateral bends $d'$ and the bail E has similar but opposite bends $e'$, which bends cause the central portions $d''$, $e''$, of the bails to lie approximately parallel with each other when both bails are raised above the kettle (see Fig. 3), and thus form a better hand hold than would otherwise be formed by the bails. When the bails are both raised, as shown at Figs. 1, 2, and 3, they may be taken hold of by the hand, as shown at Figs. 1 and 2, and will afford means by which the operator may hold the kettle firmly and securely against swinging laterally or otherwise while it is tilted as shown at same figures to pour out the contents or to pour off water and leave contents, such as potatoes or other vegetables. At Fig. 1 the kettle is shown as tilted on the stove G, while the water is poured from potatoes or other vegetables into a pan H. The lid B is held during this operation by the bails D and E, which are in contact with its outer edge as shown, so that it can rise but slightly at its lower side where the greatest pressure is against it, to permit the water to escape while it holds the vegetables in the kettle. The control of the kettle by the two bails is so great and it may be held so firmly thereby, as to permit tilting the kettle in any desired direction so as to pour from either side desired, as will partly appear from Fig. 1, in which the pouring is being done from one side of the kettle, and Fig. 2, in which it is being done from another side. In fact the control of the kettle with the two bails is so complete that the kettle may be poured from while resting on any suitable object, or may be held out and poured from without resting on any object, without any danger of the kettle swinging laterally or otherwise on its hinged connection with the bails, and in whatever position the kettle is held to pour from, the bails will hold the lid and permit pouring as shown at said figures.

The advantages arising from locating the ears on the outer surfaces and below the rim of the kettle, in the use of the two bails, in addition to holding the lid in place while pouring are as follows: The bail E may be turned up alone as shown by dotted lines at Fig. 4, for the purpose of lifting the kettle by a single bail in the ordinary manner, and when desired, the bails D and E may both be thrown over to one side of the kettle, as shown by the full line bail D and the lower dotted line E at Fig. 4. Both bails may also be turned down on the opposite side of the kettle from that shown at said figure; and to raise both bails to their upright positions it is only necessary to take hold of the lower one—the bail D, as shown at Fig. 4,—and it will, as it is raised, force the other bail E up with it.

The advantages of this simple method of holding and controlling the kettle, and holding the lid in place, while pouring, need not be enumerated here.

I am aware that lids have been held on kettles while pouring water therefrom, by bars extending across the kettle, as shown in Letters-Patent No. 212,483, to H. C. McLean, and that a pot or kettle lid has been held while pouring water therefrom by a single bail having its ends bent and formed to extend inwardly and over the lid, as shown in Letters-Patent to Morgan and Neidhart, No. 218,304; and that two cross bails have been used on kettles, as shown in Letters-Patent Nos. 162,847 and 273,119, to D. M. McLean, and I do not claim either of said constructions; the gist of my invention consisting in two bails, hinged or engaged with the pot or kettle below the upper edge of said kettle, and the main or body portion of said bails so formed that when the kettle is tilted said main or body portion of both bails will come in contact with the edge of the lid, and hold it firmly at two opposite sides thereof, while permitting one side to move slightly for the passage of water from the kettle.

What I claim as new, and desire to secure by Letters Patent, is—

A kettle comprising, two bails arranged on the body and crossing each other at their centers when in a raised position the center portion of the bails being bent parallel with each other to form a handle and pivotal connections between the bails and body arranged at points below the top of the kettle, substantially as described.

In testimony whereof I affix my signature in presence of two witnesses.

WILLIAM J. PLECKER.

Witnesses:
H. M. RICHARDS,
B. F. HOLCOMB.